United States Patent [19]

Iiyama et al.

[11] Patent Number: 4,925,828
[45] Date of Patent: May 15, 1990

[54] LEUCO DYES AND RECORDING MATERIALS USING THE SAME

[75] Inventors: Kiyotaka Iiyama, Ibaragi; Kunio Hayakawa, Gotenba; Masahiro Nakata, Osaka; Kaoru Kodera, Osaka; Osamu Miyazaki, Osaka, all of Japan

[73] Assignee: Ricoh Company, Ltd., Tokyo, Japan

[21] Appl. No.: 200,674

[22] Filed: May 31, 1988

[30] Foreign Application Priority Data

May 30, 1987 [JP] Japan .................. 62-137340
May 30, 1987 [JP] Japan .................. 62-136055

[51] Int. Cl.$^5$ ............................ B41M 5/18
[52] U.S. Cl. ................... 503/218; 427/150; 428/913; 503/217
[58] Field of Search ............ 427/150; 428/913, 914; 503/217, 218, 225

[56] References Cited

U.S. PATENT DOCUMENTS 4,770,973  9/1983  Kanda et al. ............ 503/218

FOREIGN PATENT DOCUMENTS 62-40380  2/1987  Japan .................. 503/218

OTHER PUBLICATIONS

Grif et al., "Direction of Nucleophilic Addition to Polymethine Dyes", Zhurnal Organicheskoi Khimii, vol. 15, No. 12, pp. 2503-2508, Dec. 1979.

Primary Examiner—Bruce H. Hess
Attorney, Agent, or Firm—Oblon, Spivak, McClelland, Maier & Neustadt

[57] ABSTRACT

A leuco dye having the formula

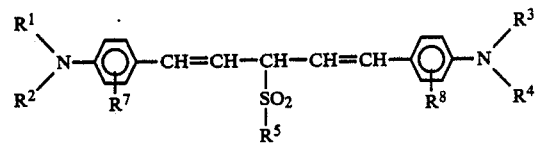

wherein $R^1$, $R^2$, $R^3$ and $R^4$ each represent a lower alkyl group; $R^5$ represents an α-naphthyl group, β-naphthyl group or

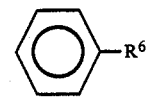

wherein $R^6$ represents —NHCOR$^9$, a halogen or an amino group which is unsubstituted or substituted by one or two $C_1$-$C_4$ alkyl groups which are the same or different; and $R^7$, $R^8$ and $R^9$ each represent hydrogen or a lower alkyl group, provided that when both $R^7$ and $R^8$ are hydrogen, $R^6$ represents —NHCOR$^9$ or bromine.

These dyes absorb in the near-infrared region and yield colored images with a color developer therefor with excellent preservability.

6 Claims, No Drawings

LEUCO DYES AND RECORDING MATERIALS USING THE SAME

BACKGROUND OF THE INVENTION

1. Field of the Invention:

This invention relates to leuco dyes used for image formation, and which dyes are capable of yielding colored images having near infrared absorbance in the range of 600 to 1,000 nm with high stability.

2. Description of the Background:

Recording materials using leuco dyes are conventionally known and used in practice, for example, as pressure-sensitive recording sheets and thermosensitive recording sheets. According to such use, a triphenylmethane leuco dye, a fluoran leuco dye, a phenothiazine leuco dye or an auramine leuco dye may be selected because these dyes have their own color tone.

Conventionally, such dyes have been developed, with an emphasis on improving the color tone, that is, on the absorption in the visible spectrum. Up to the present time, no dyes have been developed which can absorb in the near infrared region, i.e., a wave length of 700 to 1,000 nm, to a sufficient extent.

As the semiconductor laser has become prevalent, a tendency to read recorded images such as a bar code by use of the semiconductor laser has grown, and a demand for a thermosensitive recording sheet and a pressure-sensitive recording sheet which can absorb light in the near infrared region has also increased.

A variety of such leuco dyes capable of absorbing light in the near infrared region has been proposed recently, for example, monovinyl and divinyl phthalide compounds described in Japanese Laid-Open Patent Applications No. 51-121035, 51-121037, 51-121038, 57-167979 and 58-157779, and fluorene compounds in Japanese Laid-Open Patent Applications No. 59-199757 and 60-226871. However, the above leuco dyes have the shortcoming that their absorption intensity in the near infrared region is insufficient. In addition to this shortcoming, they have the shortcoming that the image formation stability is poor, which causes discoloration of colored images, and, moreover, the production cost is high.

Another near-infrared absorbing leuco dye is proposed in Japanese Laid-Open Patent Application No. 60-231766, which exhibits absorption in the near infrared region, but has the shortcoming that the preservability is poor, in particular, its heat resistance is poor.

Therefore, a need continues to exist for a leuco dye which can satisfy all of the above-mentioned requirements.

SUMMARY OF THE INVENTION

It is therefore an object of the present invention to provide a leuco dye which sufficiently absorbs light in the near infrared region and yields colored images with excellent preservability, and more particularly a leuco dye with a sufficient absorption intensity in the near infrared region ranging from 600 to 1,000 nm.

It is also an object of this invention to provide a leuco dye capable of yielding colored images which can be read by a light source covering a visible spectrum region through the near infrared region and forming colored images with high stability when used for thermosensitive recording sheets and pressure-sensitive recording sheets.

According to the present invention, the above and other objects of the present invention can be attained by providing a leuco dye having the formula (I),

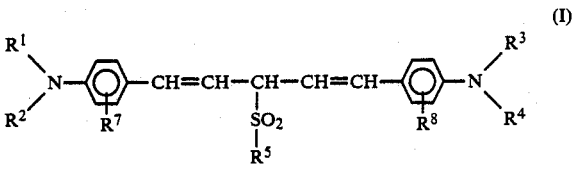

wherein $R^1$, $R^2$, $R^3$ and $R^4$ each represent a lower alkyl group; $R^5$ represents an α-naphthyl group, β-naphthyl group or

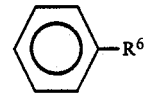

wherein $R^6$ represents —$NHCOR^9$, a halogen or an amino group which is unsubstituted or substituted by one or two alkyl groups having 1 to 4 carbon atoms, which are the same or different, and $R^7$, $R^8$ and $R^9$ each represent hydrogen or a lower alkyl group, provided that when both $R^7$ and $R^8$ are hydrogen, $R^6$ represents —$NHCOR^9$ or bromine.

DETAILED DESCRIPTION OF THE PREFERRED EMBODIMENTS

The present invention relates to leuco dyes used for image formation, and more particularly to leuco dyes having a sufficient absorption intensity in the near infrared region ranging from 600 to 1,000 nm, and which are capable of producing images which can be read under a light source covering the visible spectrum to the near infrared region. The present dyes yield colored images having remarkable stability when used as a thermosensitive recording sheet and a pressure-sensitive recording sheet.

The leuco dyes having the formula (I) of the present invention are in the form of white or light yellow fine crystals, which are stable in air. The leuco dyes, when colored, exhibit a sufficient absorption intensity in the near infrared region ranging from 600 to 1,000 nm, and rapidly induce a coloring reaction when coming into contact at the molecular level with electron acceptors (color developers) such as inorganic acids of acidic terra abla and activated clay, organic acids, phenolic compounds and phenolic resins. The above coloring reaction results in the formation of a green or blue dyestuff, which shows a remarkable preservability such that the dyestuff is considered to be valuable as a precursor.

The leuco dyes having the formula (I) of the present invention can be easily synthesized in accordance with the following reaction scheme:

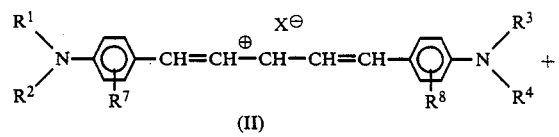

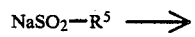

-continued

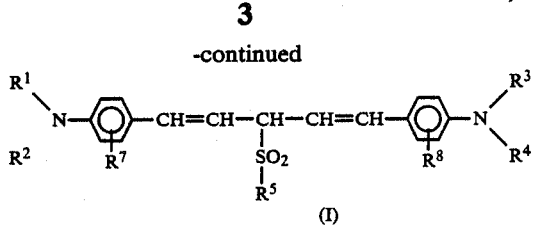

(I)

wherein $X^-$ represents an anion of halogen or perchloric acid.

The reaction can be induced by applying heat to the reaction components of (II) and (III) in a mixed solvent of methanol and acetic acid. Preparation of the above compound (II) shown in the reaction scheme is described in "Annalen der Chemie, vol. 623, page 204 (1959)."

According to the present invention, the alkyl group represented by $R^1$ through $R^4$ and $R^7$ through $R^9$ in the above formula (I) represents a straight or branched chain lower alkyl group, preferably an alkyl group having 1 to 4 carbon atoms. It is preferable that $R^6$ be $-NHCOR^9$.

Specific examples of the compounds represented by formula (I) are:

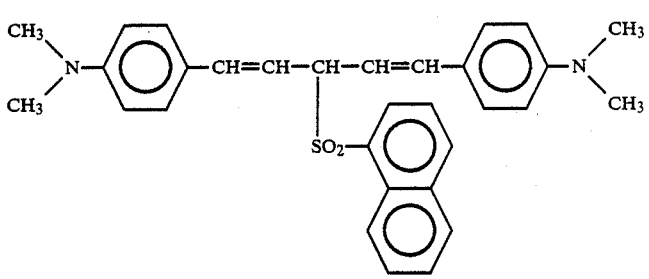

(1)

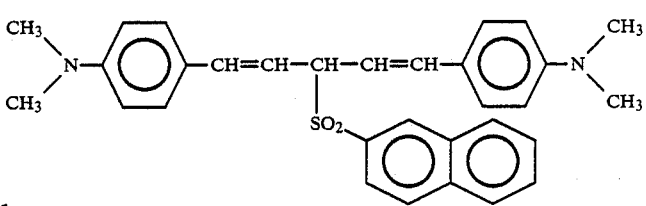

(2)

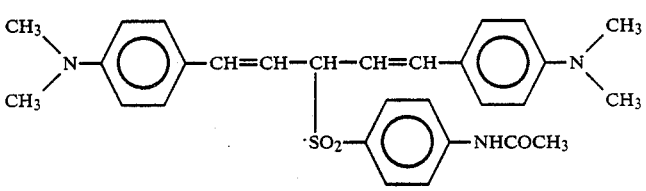

(3)

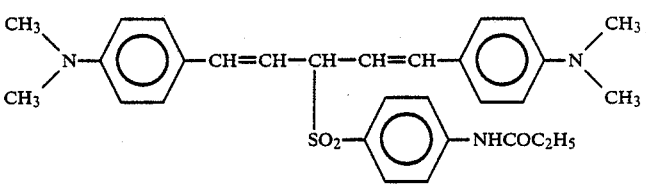

(4)

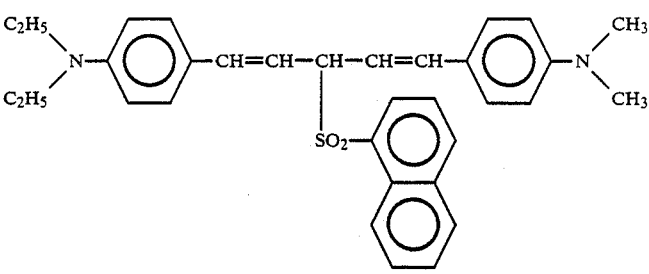

(5)

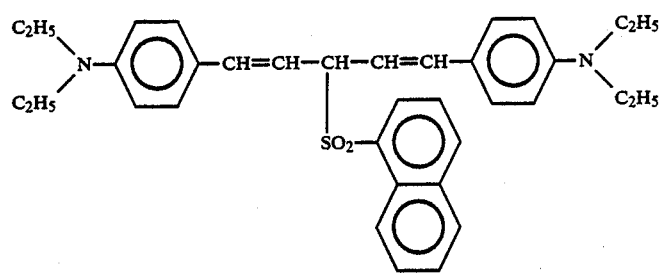 (6)
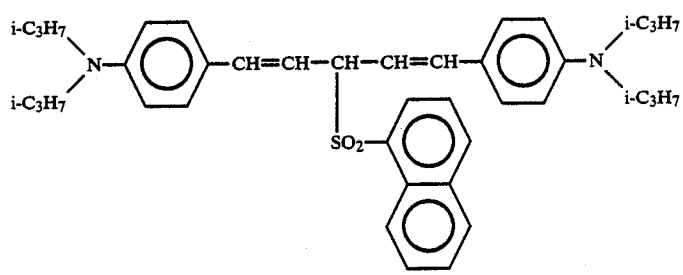 (7)
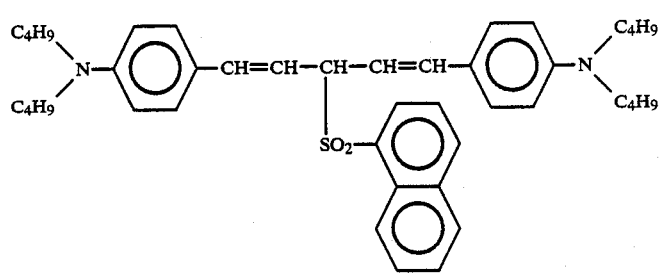 (8)
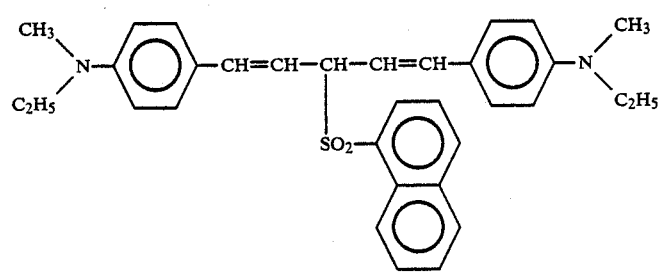 (9)
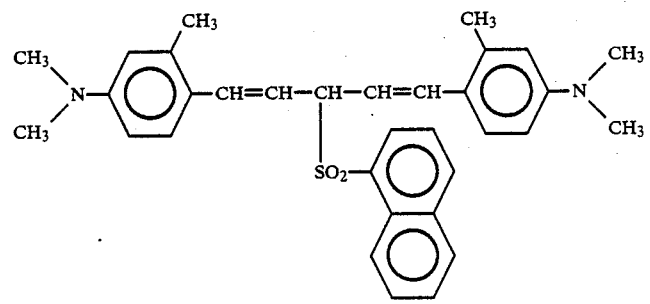 (10)
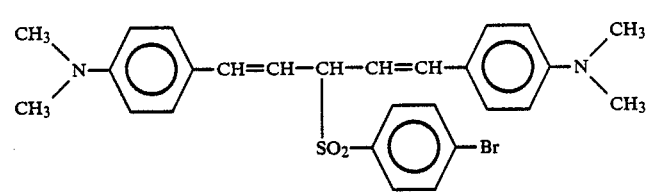 (11)

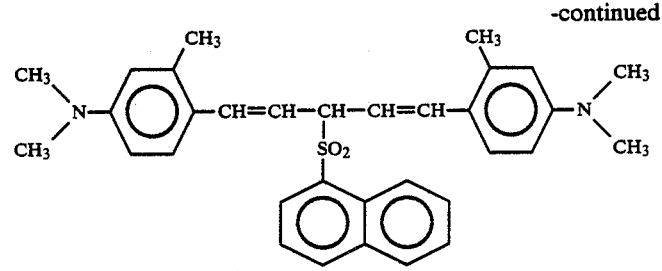
(12)
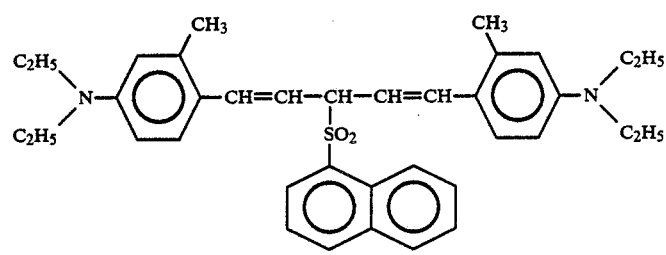
(13)
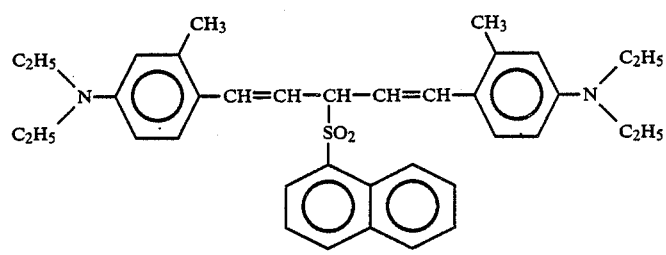
(14)
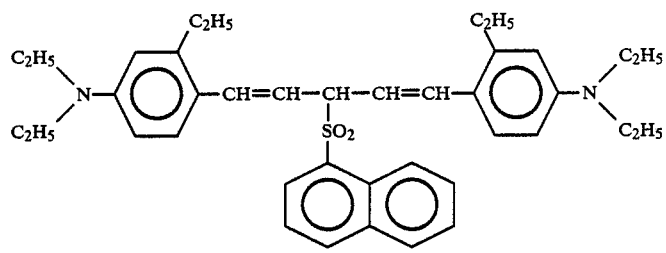
(15)
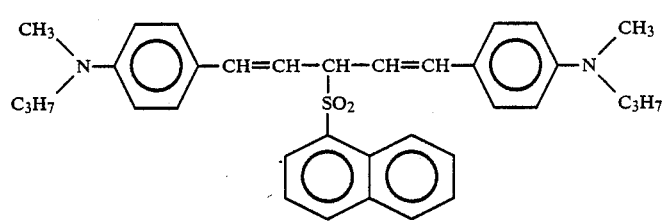
(16)
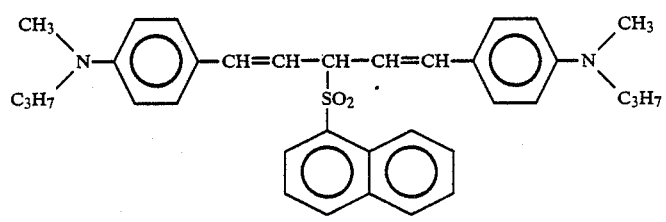
(17)
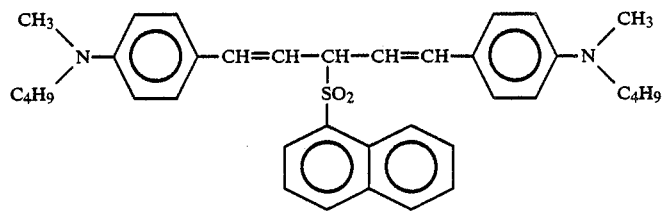
(18)

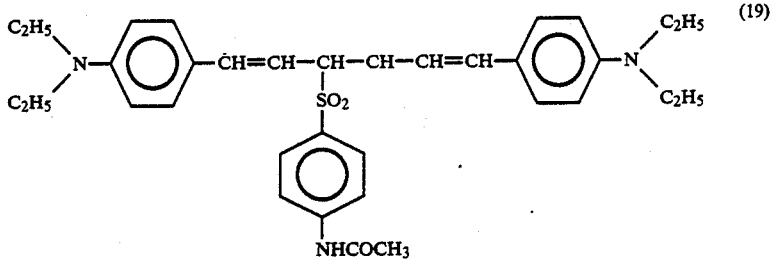

The leuco dyes according to the present invention can be employed as a color-former for use in the recording materials, such as a pressure-sensitive recording material, a thermosensitive recording material and a thermal transfer type recording material in the same manner as conventional leuco dyes.

When the leuco dyes of the present invention are employed as a pressure-sensitive recording material, the pressure-sensitive recording material can be prepared by the method disclosed in U.S. Pat. No. 2,800,457. The main properties required of the leuco dyes for use in the pressure-sensitive recording material are high oil-solubility, excellent color development by a color developer, and good image formation stability. With the above properties taken into consideration, appropriate leuco dyes may be selected for such application.

When the leuco dyes according to the present invention are employed as a thermosensitive recording material, the thermosensitive recording material can be prepared by the method described in Japanese Laid-Open Patent Application No. 45-14039. In this case, the leuco dyes are required to have the following properties: appropriate thermal-sensitive coloring performance, high degree of whiteness of the background, and sufficient stability of the leuco dyes and the coloring developer thereof. The appropriate leuco dyes are selected with these properties taken into consideration.

In any case, it is important to make the best use of the fact that the colored image formed by the leuco dyes according to the present invention exhibits an excellent absorption intensity in the near infrared region.

When the leuco dyes according to the present invention are used as a recording material, they may be employed in combination with other leuco dyes contained in conventional thermosensitive recording materials. Since the color tone caused by color formation in the leuco dyes according to the present invention is green or blue, the combination with other leuco dyes is effective for the correction of the color tone or the light absorption property.

Specific examples of leuco dyes that can be employed in combination with the leuco dyes according to the present invention are as follows:
3,3-bis(p-dimethylaminophenyl)-phthalide,
3,3-bis(p-dimethylaminophenyl)-6-dimethylaminophthalide
3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromethylanilino)fluoran,
3-diethylamino-7-(o-chloroanilino)fluoran,
3-butylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-[N,N-diethylamino)-5-methyl-7-(N,N-dibenzylamino)fluoran,
benzoyl leuco methylene blue,
6'-chloro-8'-methoxy-benzoindolino-piropyran,
6'-bromo-3'-methoxy-benzoindolino-piropyran,
3-(2'-hydroxy-4'-dimethylaminophenyl)-3-(2'-methoxy-5'chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'methylphenyl)phthalide,
3-(2'-methoxy-4'-dimethylaminophenyl)-3-(2'-hydroxy-4'-chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)fluoran,
3-(N-benzyl-N-cyclohexylamino)-5,6-benzo-7-α-naphthyl-amino-4'-bromofluoran, and
3-diethylamino-6-methyl-7-mesidino-4',5'-benzofluoran.

As the color developers for use in combination with the above leuco dyes in the present invention, a variety of electron acceptors or oxidizing agents capable of inducing color formation in the leuco dyes can be employed in order to obtain a recording material.

Specific examples of such conventional color developers are bentonite, zeolite, acidic terra abla, activated clay, colloidal silica, zinc oxide, zinc chloride, zinc bromide, aluminum chloride, salicylic acid, 3-tert-butylsalicylic acid, 3,5-di-tert-butylsalicylic acid, di-m-chlorophenyl thiourea, di-m-trifluoromethylphenyl thiourea, diphenylthiourea, salicylanilide, 4,4'-isopropylidenediphenol, 4,4'-isopropylidenebis(2-chlorophenyl), 4,4'isopropylidenebis(2,6-dibromophenol), 4,4'-isopropylidenebis(2,6-dichlorophenol), 4,4'-isopropylidenebis-(2-methylphenol), 4,4'-isopropylidenebis(2,6-dimethyl-phenol), 4,4'-isopropylidenebis(2-tertbutylphenol), 4,4'-sec-butylidenediphenol, 4,4'cyclohexylidenebisphenol, 4,4'-cyclohexylidenebis(2-methylphenol), 4-tert-butylphenol, 4-phenylphenol, 4-hydroxydiphenoxide, α-naphthol, β-naphthol, 5-hydroxy dimethyl phthalate, methyl-4-hydroxybenzoate,4-hydroxyacetophenone, novolak-type phenolic resin, 2,2'-thiobis(4,6-dichlorophenol), catechol, resorcinol, hydroquinone, pyrogalol, phloroglucine, phloroglucinocarboxylic acid, 4-tert-octylcatechol, 2,2'-methylene-bis-(4-chlorophenol), 2,2'-methylenebis(4-methyl-6-tert-butyl-phenol), 2,2'-dihydroxy-diphenyl, ethyl p-hydroxybenzoate, propyl p-hydroxybenzoate, butyl p-hydroxybenzoate, benzyl p-hydroxybenzoate, p-chlorobenzyl p-hydroxybenzoate, o-chlorobenzyl p-hydroxybenzoate, p-methylbenzyl p-hydroxy-benzoate, n-octyl benzoic acid p-hydroxybenzoate, benzoic acid, zinc salicylate, 1-hydroxy-2-naphthoic acid, 2-hydroxy-6naphthoic acid, 2-hydroxy-6-zinc naphthoate, 4-hydroxydiphenylsulfone, 4,2'-diphenol sulfone, 4-hydroxy-4'chlorodiphenyl sulfone, 4-hydroxy-4'-benzyloxy diphenyl sulfone, 4-hydroxy-4'-isopropoxy diphenyl sulfone, 4-hydroxy-4'-isobutyl oxydiphenyl sulfone, bis(4-hydroxyphenyl)sulfide, 2-hydroxy-p-toluic acid, 3,5-di-tertzinc butyl salicylate, 3,5-di-tert-tin butyl salicylate, tartaric acid, oxalic acid, maleic acid, citric acid, succinic acid, stearic acid, 4-hydroxyphthalic acid, boric acid, biimidazole, hexaphenyl biimidazole, carbon tetrabromide, methylenebis-(oxyethylenethio)diphenol, ethylenebis-(oxyethylenethio)diphenol, bis(4-hydroxyphenylthioethyl)ether, and m-xylylenebis(4hydroxyphenylthio)ether.

In order to obtain a pressure-sensitive recording material by use of the leuco dyes according to the present invention, the leuco dye is dissolved in alkylnaphthalene or tarphenyl oil with a ratio of 1 to 4%, to which a resin such as gelatin is added to form microcapsules having a diameter of about 5 μm. Such microcapsules are coated onto a support such as a sheet of paper or plastic film by use of a binder, whereby a color former sheet is prepared. Such microcapsules can be prepared by a conventional method, for instance, by the method described in U.S. Patent Ser. No. 2,800,457. A color developer sheet can be prepared by dispersing and dissolving a color developer in water or an organic solvent by means of an appropriate dispersing medium, adding a binder agent thereto when necessary, and then coating the dispersion on the support such as a sheet of paper.

In order to prepare a thermosensitive recording material by use of the leuco dye according to the present invention, the leuco dye and the color developer are individually dispersed with addition of a water-soluble resin, and an appropriate binder is added to the dispersion. The thus prepared mixture is coated onto a support such as a sheet of paper. It is preferable that the particle size of the leuco dye be from 0.5 to 5.0 μm and that the weight ratio of the leuco dye to the color developer in the mixture be from 1:1 to 1:5. The coloring layer may be formed by coating a coating liquid at a time or two times separately. Furthermore, a leuco dye layer and a color developer layer may be separately coated onto the support. An undercoat layer and/or a protective layer may be provided as known in the preparation of conventional thermosensitive recording materials.

When a thermal image transfer type recording material is prepared by use of a leuco dye according to the present invention, the leuco dye is dispersed or dissolved in water or a solvent to prepare a thermaltransfer type recording layer coating liquid. This coating liquid is coated onto a heat-resistant support such as a polyester film to form an image transfer sheet. An image receiving sheet can be prepared by dispersing or dissolving the color developer in water or a solvent to prepare a coating liquid and coating the liquid onto a support sheet.

In the present invention, a variety of conventional binder agents can be employed for binding the above-mentioned leuco dyes and color developers to the support for a thermosensitive recording material, and for supporting leuco dyes in the form of capsules and color developers on the support for a pressure-sensitive recording material.

Specific examples of such binder agents are as follows: polyvinyl alcohol; starch and starch derivatives; cellulose derivatives such as methoxy-cellulose, hydroxyethylcellulose, carboxymethylcellulose, methylcellulose and ethylcellulose; water-soluble polymeric materials such as sodium polyacrylate, polyvinyl pyrrolidone, acrylamide/acrylic acid ester copolymer, acrylamide/acrylic acid ester/methacrylic acid copolymer, styrene/maleic anhydride copolymer alkali salt, isobutylene/maleic anhydride copolymer alkali salt, polyacrylamide, sodium alginate, gelatin and casein; and latexes of polyvinyl acetate, polyurethane, styrene/butadiene copolymer, polyacrylic acid, polyacrylic acid ester, vinyl chloride/vinyl acetate copolymer, polybutylmethacrylate, ethylene/vinyl acetate copolymer and styrene/butadiene/acrylic acid derivative copolymer.

Further in the present invention, auxiliary additive components which are used in the conventional thermosensitive and pressure-sensitive recording materials, such as a filler, a surface active agent, a thermofusible material, a lubricant and a preventive agent of color formation owing to application of the pressure, can be employed, together with the above-mentioned leuco dyes and color developers.

Specific examples of a filler for use in the present invention are finely-divided inorganic powders of calcium carbonate, silica, zinc oxide, titanium oxide, aluminum hydroxide, zinc hydroxide, barium sulfate, clay, talc, surface-treated calcium and surface-treated silica, and finely-divided organic powders of urea - formaldehyde resin, styrene/methacrylic acid copolymer, and polystyrene.

As the lubricant, for example, higher fatty acids, metallic salts, amides, esters thereof, and a variety of waxes such as animal, vegetable, mineral and petroleum can be used.

The recording material containing leuco dyes for use in the present invention can be employed in various applications just like a conventional dye. In particular, since the leuco dyes of the present invention have excellent absorption intensity in the near infrared region, such leuco dyes can be utilized in an optical character reading apparatus, and can be employed as a recording material for a label bar coder and a bar code reader.

When the recording material containing leuco dyes for use in the present invention are employed as a thermosensitive recording adhesive label sheet, a thermosensitive color-forming layer containing the above leuco dyes and the color developer is formed on the front side of the support, and an adhesive layer is formed on the back side of the support, with a disposable backing sheet attached to the adhesive layer.

The present invention will now be explained in detail with reference to the following examples which are provided merely for purposes of illustration, and are not intended to limit the present invention.

EXAMPLE 1

[Synthesis of bis(p-dimethylaminostyryl)-α-naphthylsulfonylmethane (Compound No. 1)]

2.8 g of bis(p-dimethylaminostyryl)carbonium perchlorate and 1.9 g of acetate were dissolved in 80 me of methanol. To this solution, 80 me of a methanol solution containing 4.1 g of sodium α-naphthyl sulfinate was added dropwise and refluxed for 1 hour. The resulting precipitate was separated from the solution by filtration and recrystallized from a mixed solvent of benzene and hexane, whereby Compound No. 1 was obtained in the form of light yellow crystals having a melting point of 178° to 183° C. The yield was 3.1 g.

EXAMPLES 2 AND 3

Example 1 was repeated except that sodium α-naphthyl sulfinate employed in Example 1 was respectively replaced by the sodium sulfinate derivatives No. 2 and No. 3 in Group A in Table 1, whereby Compound No. 2 and Compound No. 3 were obtained.

EXAMPLE 4

Example 1 was repeated except that bis(p-dimethylaminostyryl)carbonium perchlorate employed in Example 1 was replaced by bis(p-diethylaminostyryl)carbonium perchlorate, whereby Compound No. 6 was obtained.

EXAMPLE 5

Example 1 was repeated except that bis(p-dimethylaminostyryl)carbonium perchlorate employed in Example 1 was replaced by bis p-(N-methyl-N-ethylamino)styryl carbonium perchlorate, whereby Compound No. 9 was obtained.

EXAMPLE 6

Example 1 was repeated except that bis(p-dimethylaminostyryl)carbonium perchlorate employed in Example 1 was replaced by bis (4-dimethylamino-2-methylstyryl)carbonium perchlorate, whereby Compound No. 10 was obtained.

The color tones and the melting points of five Compounds obtained by Examples 2 through 6 are shown in Table 1.

TABLE 1

| Examples | Group A | Product | Color Tone | Melting Point(°C.) |
|---|---|---|---|---|
| 2 | naphthyl-SO₂Na | Compound No. 2 | Light yellow | 182~186 |
| 3 | CH₃CONH—⟨phenyl⟩—SO₂Na | Compound No. 3 | Light yellow | 133~150 |
| 4 | naphthyl-SO₂Na | Compound No. 6 | Slightly pale yellow | 153~161 |
| 5 | naphthyl-SO₂Na | Compound No. 9 | Slightly pale yellow | 155~165 |

TABLE 1-continued

| Examples | Group A | Product | Color Tone | Melting Point(°C.) |
|---|---|---|---|---|
| 6 | 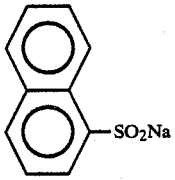—SO₂Na | Compound No. 10 | Slightly pale yellow | 85~90 |

Embodiments of the leuco dye according to the present invention will now be explained with reference to the following examples.

EXAMPLES 1 TO 6, AND COMPARATIVE EXAMPLES 1 TO 6

A dispersion A and a dispersion B were separately prepared by dispersing the following respective components in a ball mill:

|  | Parts by Weight |
|---|---|
| [Dispersion A] | |
| Each leuco dye in Table 2 | 10 |
| 10% aqueous solution of polyvinyl alcohol | 10 |
| Water | 30 |
| [Dispersion B] | |
| Stearic acid amide | 20 |
| Calcium carbonate | 20 |
| 4,4'-diphenol sulfone | 30 |
| 10% aqueous solution of polyvinyl alcohol | 35 |
| Water | 210 |

The thus obtained dispersion A and the dispersion B were mixed in a ratio by weight of 1 to 1, so that a coating liquid was prepared. This coating liquid was coated into a sheet of wood free paper in such a manner that the deposition of leuco dye component was 0.6 g/m² on a dry basis, and then dried, whereby thermosensitive recording materials No. 1 through No. 6 according to the present invention were prepared.

In the same manner as described above, comparative thermosensitive recording materials Nos. 1 to 6 were prepared by use of the respective leuco dyes in Table 2.

The thus prepared thermosensitive recording materials Nos. 1 to 6 according to the present invention and the comparative thermosensitive recording materials Nos. 1 to 6 were subjected to a thermal printing test by use of a commercially available facsimile equipment (Trademark "Rifax 130" made by Ricoh Company, Ltd.).

The density of the formed images and the background density were measured by use of a Macbeth densitometer 914 with a filter W-106.

The absorbance was measured by a reflective spectrophotometer (Trademark "Hitachi 330-type Spectrophotometer" made by Hitachi, Ltd.), and then the PCS value of each printed sample was obtained by the following formula:

$$PSC \text{ value } (\%) = \frac{\text{Reflection Ratio of background} - \text{Reflection Ratio of Image Area}}{\text{Reflection Ratio of Background}} \times 100\%$$

Further, printed samples of the above recording materials were subjected to a heat resistant test by allowing each printed sample to stand at 60° C. for 24 hours. Thereafter, the density of the formed images and the background density were measured in the same manner as mentioned above, and the PCS value of each printed samples, which is defined by the above formula, was obtained after the heat resistance test.

The results of the above tests are shown in Table 2. From Table 2, it can be seen that recording materials prepared using the present leuco dyes yield images having a good absorption intensity in the nearinfrared absorption range of from 600 to 1,000 nm with high stability.

TABLE 2

| No. | Leuco Dye | Immediately After Printing Test | | | After Heat-resistance Test | | |
|---|---|---|---|---|---|---|---|
| | | Colored Image Density | Background Density | PCS Value at 900 nm | Colored Image Density | Background Density | PCS Value at 900 nm |
| Ex. 1 | Compound No. 1 | 1.26 | 0.08 | 90% or more | 1.26 | 0.10 | 90% or more |
| Ex. 2 | Compound No. 2 | 1.23 | 0.09 | 90% or more | 1.22 | 0.10 | 90% or more |
| Ex. 3 | Compound No. 3 | 1.20 | 0.10 | 90% or more | 1.18 | 0.09 | 90% or more |
| Ex. 4 | Compound No. 6 | 1.26 | 0.09 | 90% or more | 1.25 | 0.09 | 90% or more |
| Ex. 5 | Compound No. 9 | 1.25 | 0.08 | 90% or more | 1.22 | 0.09 | 90% or more |
| Ex. 6 | Compound No. 10 | 1.24 | 0.08 | 90% or more | 1.24 | 0.09 | 90% or more |
| Comparative Ex. 1 | Bis(p-dimethyl-aminostyryl)-p-tolylsulfonyl-methane | 1.25 | 0.09 | 90% or more | 1.23 | 0.12 | 70% or less |
| Comparative Ex. 2 | Crystal Violet lactone | 1.29 | 0.09 | 10% or less | 1.19 | 0.13 | 10% or less |
| Comparative Ex. 3 | 3-diethylamino-6-methyl-7-anilinofluoran | 1.30 | 0.09 | 10% or less | 1.28 | 0.12 | 10% or less |
| Comparative | Bis(p-dimethyl- | 1.26 | 0.12 | 75% or less | 1.20 | 0.12 | 70% or less |

TABLE 2-continued

| No. | Leuco Dye | Immediately After Printing Test | | | After Heat-resistance Test | | |
|---|---|---|---|---|---|---|---|
| | | Colored Image Density | Background Density | PCS Value at 900 nm | Colored Image Density | Background Density | PCS Value at 900 nm |
| Ex. 4 | aminostyryl)-benzenesulfonyl-methane | | | | | | |
| Comparative Ex. 5 | Bis(p-dimethyl-aminostyryl)-p-chlorobenzene-sulfonyl-methane | 1.23 | 0.10 | 75% or less | 1.18 | 0.10 | 70% or less |
| Comparative Ex. 6 | Bis(p-dimethyl-aminostyryl)-p-dimethylamino-benzenesulfonyl-methane | 1.21 | 0.11 | 75% or less | 1.20 | 0.11 | 70% or less |

EXAMPLES 13 TO 16

Example 1 was repeated except that Dispersion B was replaced by the following Dispersion C, whereby recording materials Nos. 7 to 10 according to the present invention were prepared:

| [Dispersion C] | Parts by Weight |
|---|---|
| Stearic acid amide | 20 |
| Calcium carbonate | 20 |
| Each compound in Group B in Table 3 | 30 |
| 10% aqueous solution of polyvinyl alcohol | 35 |
| Water | 210 |

The recording materials No. 7 to No. 10 according to the present invention were subjected to the same evaluation tests as in Example 7. The results are shown in Table 3.

As can be seen from the results in Table 3, the recording materials containing the present leuco dyes are capable of yielding images having a good absorption intensity in the near infrared region ranging from 600 nm to 1,000 nm, with high stability.

TABLE 3

| No. | Leuco Dyes in Group B | Immediately After Printing Test | | | After Heat-resistance Test | | |
|---|---|---|---|---|---|---|---|
| | | Colored Image Density | Background Density | PCS Value at 900 nm | Colored Image Density | Background Density | PCS Value at 900 nm |
| Ex. 7 | 4-hydroxy-4'-iso-propoxy-diphenyl-sulfone | 1.24 | 0.08 | 90% or more | 1.22 | 0.09 | 90% or more |
| Ex. 8 | 4-hydroxy-4'-benzyloxydiphenyl-sulfone | 1.24 | 0.08 | 90% or more | 1.25 | 0.10 | 90% or more |
| Ex. 9 | 4,4'-thiobis(2-tert-butyl-5-methylphenol) | 1.23 | 0.08 | 90% or more | 1.22 | 0.09 | 90% or more |
| Ex. 10 | 4,4'-cyclo-hexylidene-diphenol | 1.24 | 0.08 | 90% or more | 1.26 | 0.09 | 90% or more |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A recording material, comprising a support and a recording layer formed thereon, said recording layer comprising a binder and a leuco dye having the formula (I), which is colored upon being brought into contact with a color developer capable of inducing color formation in said leuco dye, thereby forming images which absorb light in a near infrared region:

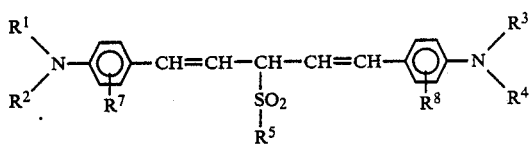

wherein $R^1$, $R^2$ $R^3$ and $R^4$ each represent a lower alkyl group; $R^5$ represents an α-naphthyl group, β-naphthyl group or a group of the formula:

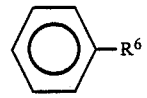

wherein $R^6$ represents —$NHCOR^9$, a halogen or an amino group which is unsubstituted or substituted by one or two $C_1$–$C_4$ alkyl groups which are the same or different; and $R^7$, $R^8$ and $R^9$ each represent hydrogen or a lower alkyl group, provided that when both $R^7$ and $R^8$ are hydrogen, $R^6$ represents —$NHCOR^9$ or bromine.

2. The recording material as claimed in claim 1, wherein $R^5$ in said formula (I) represents an α-naphthyl group or β-naphthyl group, and $R^7$ and $R^8$ each represent hydrogen or a lower alkyl group.

3. The recording material as claimed in claim 1, wherein $R^5$ in said formula (I) represents

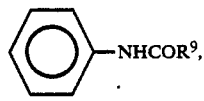

and $R^7$, $R^8$ and $R^9$ each represent hydrogen or a lower alkyl group.

4. The recording material as claimed in claim 3, wherein said alkyl group represented by $R^7$, $R^8$ and $R^9$ is an alkyl group having 1 to 4 carbon atoms.

5. The recording material as claimed in claim 1, wherein said lower alkyl group represented by $R^7$ and $R^8$ in said formula (I) is an alkyl group having 1 to 4 carbon atoms.

6. The recording material as claimed in claim 1, wherein said recording layer further comprises one or more other leuco dyes capable of correcting the color tone or the light absorbing properties of the leuco dye of the formula (I).

* * * * *

UNITED STATES PATENT AND TRADEMARK OFFICE
CERTIFICATE OF CORRECTION

PATENT NO. : 4,925,828
DATED : May 15, 1990
INVENTOR(S) : Masahiro Nakata, et al.

It is certified that error appears in the above-identified patent and that said Letters Patent is hereby corrected as shown below:

Column 9, line 59, after "thalide" insert --,--.

Column 11, line 14, after "4,4" (first occurrence) insert -- - --;

line 30, after "6" insert -- - --;

line 32, after "4'" insert -- - --;

line 42, after "bis" insert -- - --;

line 43, after "(4" insert -- - --;

line 54, delete "Ser.".

Column 12, line 12, change "thermaltransfer" to --thermal-transfer--.

Column 13, line 21, change "me" to --ml--;

line 22, change "me" to --ml--.

Column 15, line 40, change "into" to --onto--.

Column 18, line 31, change "$R^2R^3$" to --$R^2,R^3$--.

Signed and Sealed this

Fourth Day of August, 1992

Attest:

DOUGLAS B. COMER

Attesting Officer        Acting Commissioner of Patents and Trademarks